United States Patent
Lin

(10) Patent No.: US 9,718,962 B2
(45) Date of Patent: Aug. 1, 2017

(54) COMPOSITION FOR LATEX PAD, PRODUCING METHOD THEREOF, AND THE LATEX PADS MADE THEREFROM

(71) Applicant: DER YOU ENTERPRISE CO., LTD., Taichung (TW)

(72) Inventor: Chin-Sheng Lin, Taichung (TW)

(73) Assignee: DER YOU ENTERPRISE CO., LTD., Taichung (TW)

(*) Notice: Subject to any disclaimer, the term of this patent is extended or adjusted under 35 U.S.C. 154(b) by 773 days.

(21) Appl. No.: 14/093,022

(22) Filed: Nov. 28, 2013

(65) Prior Publication Data

US 2015/0084223 A1 Mar. 26, 2015

(30) Foreign Application Priority Data

Sep. 26, 2013 (TW) .............................. 102134881 A

(51) Int. Cl.
| | | |
|---|---|---|
| *C08L 101/00* | (2006.01) | |
| *B29C 39/00* | (2006.01) | |
| *C08J 9/00* | (2006.01) | |
| *B29C 44/02* | (2006.01) | |
| *C08J 3/00* | (2006.01) | |
| *C08J 3/21* | (2006.01) | |
| *B29K 7/00* | (2006.01) | |
| *B29K 505/14* | (2006.01) | |
| *B29K 507/04* | (2006.01) | |
| *B29K 509/00* | (2006.01) | |
| *B29K 105/00* | (2006.01) | |

(52) U.S. Cl.
CPC .......... *C08L 101/00* (2013.01); *B29C 39/003* (2013.01); *B29C 44/022* (2013.01); *C08J 3/005* (2013.01); *C08J 3/212* (2013.01); *C08J 9/008* (2013.01); *C08J 9/0061* (2013.01); *B29K 2007/00* (2013.01); *B29K 2105/0064* (2013.01); *B29K 2505/14* (2013.01); *B29K 2507/04* (2013.01); *B29K 2509/00* (2013.01); *C08J 2205/06* (2013.01); *C08J 2321/02* (2013.01); *C08J 2407/02* (2013.01)

(58) Field of Classification Search
CPC . C08J 3/212; C08J 2407/02; C08J 9/36; C08J 3/005; C08J 9/0061; C08J 9/008
See application file for complete search history.

(56) References Cited

U.S. PATENT DOCUMENTS 4,223,458 A * 9/1980 Kihara ................. A43B 1/0009
36/44

FOREIGN PATENT DOCUMENTS

CN 102010528 A * 4/2011

OTHER PUBLICATIONS

Translation of CN 102010528, Wu et al., Apr. 13, 2011, p. 1-10.*
Translation of TW 200939984, J Lin, Oct. 1, 2009, p. 1-3.*

* cited by examiner

*Primary Examiner* — Hai Vo
(74) *Attorney, Agent, or Firm* — Pai Patent & Trademark Law Firm; Chao-Chang David Pai

(57) ABSTRACT

The present invention relates to a composition for preparation of latex pads, comprising natural latex, artificial latex, sliver nanoparticles, zinc oxide nanoparticles, and active carbon mixed in a specified proportion. The present invention also provides a method for manufacturing latex pads from the composition.

1 Claim, No Drawings

COMPOSITION FOR LATEX PAD, PRODUCING METHOD THEREOF, AND THE LATEX PADS MADE THEREFROM

BACKGROUND OF THE INVENTION

Technical Field of the Invention

The present invention relates to a composition for producing latex pads, and its preparation method. The present invention further relates to a method for manufacturing latex pads from the composition, and the latex pad products made by the method.

Background

Conventional latex pads are made from a mixture of natural latex and artificial latex at a proportion of 20%:80% by weight. The said natural latex is composed of 40% water and 60% solid content of plastic materials and the said artificial latex is composed of 30% water and 70% solid content of plastic materials. The producing method of conventional latex pad comprises adding a certain dose of vulcanizing promoter, and preparing a latex mixture under a condition of stirring at 1200 revolutions/min (rpm) for 20 minutes.

In the conventional method for producing latex pads, the mixture is poured into a high speed foaming machine, and formed into a foamed material in the foaming procedure. The foamed material is then poured into a coating machine, and infused onto a conveying platform set at a transfer speed of 5 cm/min. The thickness of foamed material spreading on the conveying platform is adjusted by the set transferring condition of the conveying platform. Subsequently, the foamed material is subjected to a first shaping process by transient baking at 250° C. to solidify the surface of the foamed material. The foamed material is transferred to a 150° C. oven to perform a second shaping process before cooling into a latex pad. Finally, the formed latex pad is covered with an isolation paper (membrane) and then rolled into a coil for storage.

The said conventional latex pads are used to provide a vibration suppression function as a buffering material between two objects through their soft and elastic characteristics. For example, latex pads may be used in producing shoe pads and provide soft flexibility, comfort, and buffering capacity during walking.

Additional features may be added to the conventional latex pads by the addition of active carbon or other functional materials. For example, the major problem of adding active carbon in latex pads is that active carbon has excellent moisture absorption property. The natural latex and synthetic latex both are aqueous liquid material, and the moisture content in these materials will be significantly reduced by the incorporation of active carbon, which will cause the latex mixture to solidify quickly in the changed mixture proportion and will become hard to stir in the subsequent processes. Other problems will also be encountered when other functional materials are added in the latex mixture.

Therefore, the content and proportion of components and water in the latex mixture must be calculated precisely, and the operating condition in the subsequent processes should also be adjusted when active carbon and other functional materials are added to the latex mixture.

SUMMARY OF INVENTION

Accordingly, in one aspect, the present invention provides a composition for producing latex pads, comprising natural latex, artificial latex, sliver nanoparticles, zinc oxide nanoparticles, and active carbon. In the composition of present invention, the moisture content, and also the content of each component in the natural and artificial latex materials are specified at a certain proportion for better stirring and more homogeneous admixture in subsequent processes. In particular, the proportion of sliver nanoparticles and zinc oxide nanoparticles could make these nanoparticles evenly dispersed in the latex mixture by stirring to avoid the aggregation of nanoparticles, which may compromise the function and performance of the sliver and zinc oxide nanoparticles. Furthermore, the zinc oxide nanoparticles present in the latex mixture may be helpful to significantly increase the addition proportion of active carbon, so that the functionalities of active carbon in latex will be displayed more obviously.

The composition of present invention is characterized in comprising 20% by weight of natural latex, containing 50% water; 80% by weight of artificial latex, containing 40% water; 3% by weight of sliver nanoparticles, based on the total weight of the mixture of natural latex and artificial latex; 5% by weight of zinc oxide nanoparticles, based on the total weight of the mixture of natural latex, artificial latex and sliver nanoparticles; and 5% by weight of active carbon, based on the total weight of the mixture of natural latex, artificial latex, sliver nanoparticles and zinc oxide nanoparticles.

In another aspect, the present invention relates to a method for producing a latex pad from the composition as described above. The method for preparing the composition comprises the following steps: (1) mixing the natural latex and the artificial latex in an agitating machine; (2) adding sliver nanoparticles to the mixture of latex materials obtained in step (1) and stirring continuously until the sliver nanoparticles are evenly dispersed in the latex materials to form a nano silver-latex mixed material; (3) adding zinc oxide nanoparticles to the nano silver-latex mixed material obtained in step (2) and stirring continuously until the zinc oxide nanoparticles are evenly dispersed in the latex materials to form a nano zinc oxide-nano silver-latex mixed material; (4) adding active carbon to the nano zinc oxide-nano silver-latex mixed material obtained in step (3) and stirring continuously to form an active carbon-nano zinc oxide-nano silver-latex mixed material; and (5) adding a vulcanizing promoter to the active carbon-nano zinc oxide-nano silver-latex mixed material and stirring continuously to form the composition for producing latex pads.

The method for producing latex pads from the prepared composition comprises following steps: (1) foaming the composition in a foaming procedure to form a foamed material; (2) plating the foamed material onto a conveying platform, adjusting the thickness of foamed material and leveling down by scraping; (3) transferring the scraped foamed material in step (2) into a high temperature oven by the conveying platform to solidify the surface of the foamed material and form a surface fixed material; (4) transferring the surface fixed material into an oven by the conveying platform and baking it to form a ripened material; (5) transferring the ripened material into a cold roller by the conveying platform and pressure roll cooling to form a latex pad; and (6) covering the formed latex pad with an isolation paper and winding into a coil of latex pad.

In a further aspect, the present invention provides a latex pad produced by the composition and the method as described above. The latex pad is made of a mixed material comprising natural latex, artificial latex, sliver nanoparticles, zinc oxide nanoparticles, and active carbon. The latex pad of present invention exhibits good mechanical properties of soft resilience, extensibility, ductility resistance and tear resistance, and possesses properties of high cleanliness, temperature resistance, aging resistance, wear resistance, and functional efficacy of bacterial killing, temperature lowering, warming, improved moisture absorption, deodorization, mildew proofing, microbial inhibiting and ventilating. The performance of moisture absorption, deodorization, mildew proofing, microbial inhibiting and ventilating by the produced latex pad in this invention may be relatively raised in comparison to prior art by increasing the added proportion of active carbon from 2% to 5% by weight.

BRIEF DESCRIPTION OF THE DRAWINGS

No drawing appended.

DETAILED DESCRIPTION OF THE INVENTION

The other characteristics and advantages of the present invention will be further illustrated and described in the following examples. The examples described herein are using for illustrations, not to limit the scope of the invention.

In the present disclosure, the composition for latex pad comprises natural latex, artificial latex, sliver nanoparticles, zinc oxide nanoparticles, and active carbon, wherein the moisture content of water contained in the natural latex and the artificial latex is 50% and 40%, respectively.

The composition for latex pad of this invention is prepared by a method comprising: step 1, mixing the natural latex and the artificial latex at a proportion of 20% to 80% (by weight) in an agitating machine at a stirring speed of 1200 rpm for 20 minutes; step 2, adding sliver nanoparticles to the mixture of latex materials obtained in step 1 at a proportion of 3% (by weight) to the total weight of the latex material mixture, and stirring continuously at a speed of 1200 rpm for 30 minutes until the sliver nanoparticles are evenly dispersed in the latex materials to form a nano silver-latex mixed material; step 3, adding zinc oxide nanoparticles to the nano silver-latex mixed material obtained in step 2 at a proportion of 5% (by weight) to the total weight of the nano silver-latex material mixture, and stirring continuously at a speed of 1200 rpm for 15 minutes until the zinc oxide nanoparticles are evenly dispersed in the latex materials to form a nano zinc oxide-nano silver-latex mixed material; step 4, adding active carbon to the nano zinc oxide-nano silver-latex mixed material obtained in step 3 at a proportion of 5% (by weight) to the total weight of the nano zinc oxide-nano silver-latex material mixture, and stirring at a speed of 1200-1600 rpm for 6 minutes to form an active carbon-nano zinc oxide-nano silver-latex mixed material; and step 5, adding a vulcanizing promoter to the active carbon-nano zinc oxide-nano silver-latex mixed material at a proportion of 5% (by weight) to the total weight of the active carbon-nano zinc oxide-nano silver-latex material mixture, and stirring at a speed of 1200-1600 rpm for 5 minutes to form the composition for producing latex pads. The vulcanizing promoter added in the composition may be a nitrogen- and/or sulfur-containing organic compound, such as aldehyde amines, guanidines, tetraethylthiuram disulfides, thiazoles, disulfo-carbamates, xanthates, thioureas and sulfonamides, used alone or in combination.

In certain embodiments of the disclosure, the composition comprises following components in proportion of: 20% by weight of natural latex containing 50% moisture content; 80% by weight of artificial latex containing 40% moisture content; 3% by weight of sliver nanoparticles, based on the total weight of the mixture of the latex materials; 5% by weight of zinc oxide nanoparticles, based on the total weight of the mixture of the latex materials and the sliver nanoparticles; 5% by weight of active carbon, based on the total weight of the mixture of the latex materials, the sliver nanoparticles and the zinc oxide nanoparticles; and 5% by weight of a vulcanizing promoter, based on the total weight of the mixture of the latex materials, the sliver nanoparticles, the zinc oxide nanoparticles and active carbon.

In the composition of the present invention, the moisture content in the natural latex and the artificial latex is set to be 50% and 40%, respectively. These settings for the moisture content in latex materials are beneficial to the incorporation of active carbon, which will largely reduce the moisture content in such latex materials because of the moisture absorption property of active carbon. Consequently, the decrease in the moisture content of latex materials will cause difficulty in stirring, and even an aggregate of the latex materials. To avoid the problem of adding active carbon described above and ensure sufficient dispersion of active carbon in latex materials, the moisture content in individual latex material is specified for maintaining proper water content in the final composition after the incorporation of active carbon. Moreover, the high moisture content in latex materials is also facilitates easier stirring and mixing for the addition of sliver and zinc oxide nanoparticles, which can prevent agglomeration of such nanoparticles while causing them to be homogeneously dispersed in the present composition.

The incorporation of sliver nanoparticles in the present composition is aimed to confer an anti-bacterial (or microbial inhibiting) efficacy to the latex pad product.

The presence of zinc oxide nanoparticles in the present composition exhibits enhancing effects in sulfurization activity to increase crosslink densities of the latex materials, and improve mechanical properties of the present composition, such as extensibility, ductility resistance and tear resistance. Meanwhile, latex pad products made from present composition will possess properties of high cleanliness, temperature resistance, aging resistance, wear resistance, functions of bacterial killing, temperature lowering, warming, and producing capacity of far-infrared ray and negative ions.

The purpose of incorporating active carbon is to confer improved properties of moisture absorption, deodorization, mildew proofing, microbial inhibiting and ventilating upon the latex pad products made from present composition. It is noticeable that the proportion of added active carbon in the present composition is increased to 5% by weight, as compared to the active carbon content of 2% by weight in previous products.

An exemplary producing method of latex pads using the present composition comprises the following steps.

(1) Foaming step, the composition prepared as described above in the disclosure is poured into a storage tank, and subjected to a foaming process to form a foamed material.

(2) Plating step, the foamed material is poured into a coating machine, and then plated onto a conveying platform by the coating machine and leveled down by scraping, and the coating thickness is adjusted as needed.

(3) First rapid-shaping step at high temperature, the scraped foamed material is transferred into a high temperature oven by the conveying platform at a speed of 3 m/min, and the surface of the foamed material is solidified to form a surface fixed material at 265° C. In this step, the speed of ripening latex materials induced by the vulcanizing promoter is reduced by the incorporated active carbon. Thus, the foamed material is transferred at a relatively lower speed (as compared to a traditional transferring speed of 5 m/min) into a relatively higher temperature oven (as compared to a traditional working temperature of 250° C.).

(4) Second ripening step, the surface fixed material is transferred into an oven by the conveying platform at a speed of 3 m/min, and baked at a ripening temperature of 165° C. to form a ripened material with stable performance. In this step, the ripening temperature in the oven is higher than the traditional working temperature of 150° C.

(5) Cooling step, the ripened material is transferred into a cold roller by the conveying platform at a speed of 3 m/min, and subjected to a pressure roll cooling process at 20° C. to form a latex pad.

(6) Winding step, the surface of formed latex pad is covered with an isolation paper, and the latex pad is wound together with the isolation paper into a coil of latex pad. The isolation paper may be a membrane made of polyethylene (PE).

The coil of latex pad produced by the composition and method according to the present invention may be processed into various kinds of pad body products, such as shoe pads, chest pads, and the like. Because the latex pad is made from the present composition, the pad body products will contain functional additives including nano sliver, nano zinc oxide and active carbon, in addition to the latex materials of natural latex and artificial latex. Therefore, the pad body products will exhibit good mechanical properties of soft resilience, extensibility, ductility resistance and tear resistance, and also possess characterized properties of high cleanliness, temperature resistance, aging resistance, wear resistance, and functional efficacy of bacterial killing, temperature lowering, warming, improved moisture absorption, deodorization, mildew proofing, microbial inhibiting and ventilating. It is noticed that the moisture absorption, deodorization, mildew proofing, microbial inhibiting and ventilating efficacies of the latex pad products will be relatively improved because the proportion of active carbon added in the latex pad is increased from 2% to 5% by weight.

What is claimed is:

1. A latex pad produced by a method comprising the steps of:
    step 1: mixing 20 parts by weight of a natural latex with about 50% moisture content and 80 parts by weight of an artificial latex with about 40% moisture content in an agitating machine at a stirring speed of 1200 rpm for 20 minutes to obtain a mixture of latexes;
    step 2: adding silver nanoparticles to the mixture of latexes obtained in step 1 at a proportion of about 3% by weight based on 100% by weight of the mixture of latexes, and stirring continuously at a speed of 1200 rpm for 30 minutes until the silver nanoparticles are evenly dispersed in the latexes to form a nano silver-latex mixture;
    step 3: adding zinc oxide nanoparticles to the nano silver-latex mixture obtained in step 2 at a proportion of about 5.15% by weight based on 100% by weight of the mixture of latexes, and stirring continuously at a speed of 1200 rpm for 15 minutes until the zinc oxide nanoparticles are evenly dispersed in the latexes to form a nano zinc oxide-nano silver-latex mixture;
    step 4: adding active carbon to the nano zinc oxide-nano silver-latex mixture obtained in step 3 at a proportion of about 5.41% by weight based on 100% by weight of the mixture of latexes, and stirring at a speed of 1200-1600 rpm for 6 minutes to form an active carbon-nano zinc oxide-nano silver-latex mixture;
    step 5: adding a vulcanizing promoter to the active carbon-nano zinc oxide-nano silver-latex mixture obtained in step 4 at a proportion of about 5.68% by weight based on 100% by weight of the mixture of latexes, and stirring at a speed of 1200-1600 rpm for 5 minutes to form a composition for producing a latex pad;
    step 6: pouring the composition prepared in step 5 into a storage tank, and subjecting it to a foaming process to form a foamed material;
    step 7: pouring the foamed material obtained in step 6 into a coating machine, then plating the foamed material onto a conveying platform via the coating machine, and leveling down the plated foamed material by scraping;
    step 8: transferring the scraped foamed material obtained in step 7 into a high temperature oven by the conveying platform at a speed of 3 m/min, and solidifying the surface of the foamed material at 265° C. to form a surface fixed material;
    step 9: transferring the surface fixed material obtained in step 8 into an oven by the conveying platform at a speed of 3 m/min, and bake ripening the material at 165° C. to form a ripened material;
    step 10: transferring the ripened material obtained in step 9 into a cold roller by the conveying platform at a speed of 3 m/min, and carrying out pressure roll cooling process at 20° C. to form a latex pad;
    step 11: covering the latex pad obtained in step 10 with an isolation membrane made of polyethylene, and winding the latex pad together with the isolation membrane into a coil of latex pad,
    wherein the latex pad comprises 20 parts by weight of natural latex and 80 parts by weight of artificial latex;
    said latex pad further including 3.00% by weight of silver nanoparticles, 5.15% by weight of zinc oxide nanoparticles, 5.41% by weight of active carbon, and 5.68% by weight of the vulcanizing promoter, based on 100% by weight of the natural and artificial latexes.

* * * * *